March 11, 1958    H. A. BERNREUTER    2,826,740
ELECTRICAL INSTRUMENTS WITH CORE MAGNET MOVEMENT
Filed April 6, 1953    2 Sheets-Sheet 1
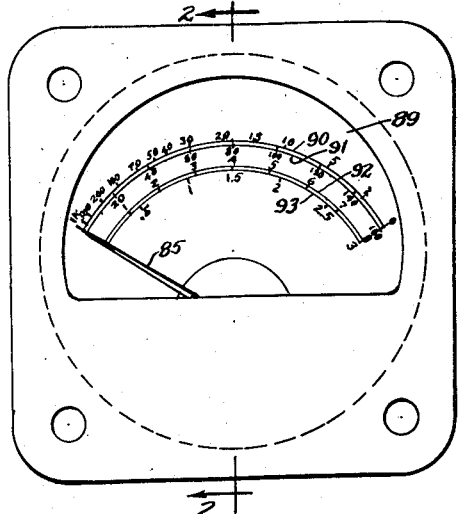
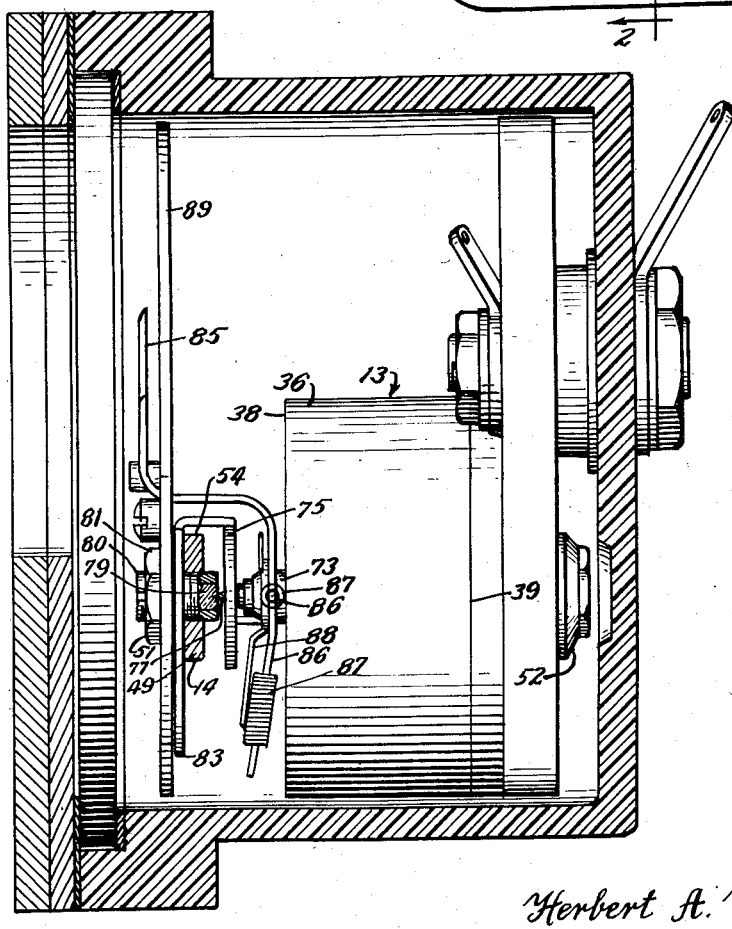
INVENTOR.
Herbert A. Bernreuter
BY
Robert H. Wendt
Atty.

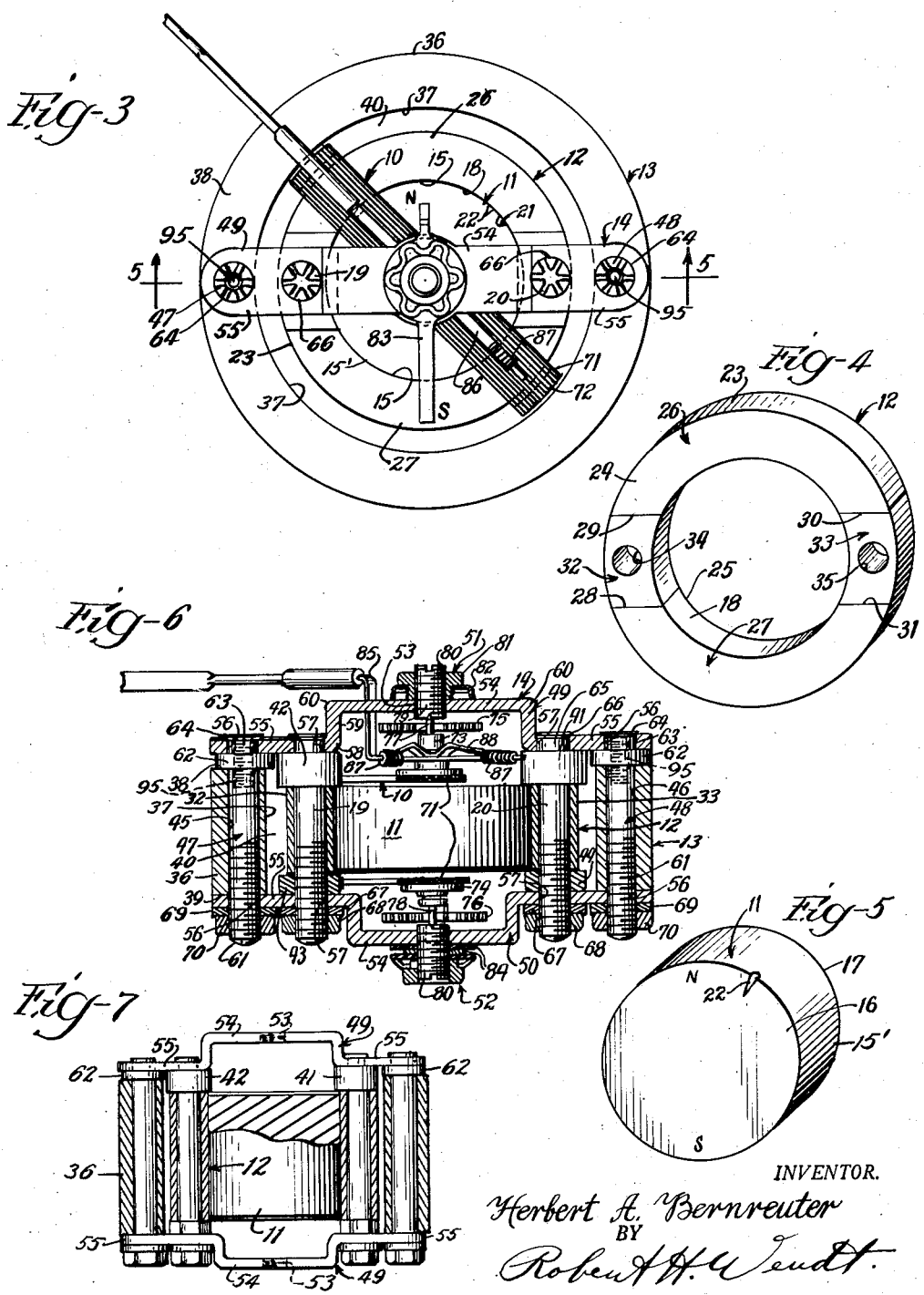

United States Patent Office 2,826,740
Patented Mar. 11, 1958

2,826,740

ELECTRICAL INSTRUMENTS WITH CORE MAGNET MOVEMENT

Herbert A. Bernreuter, Elmwood Park, Ill., assignor to American Gage & Machine Company, Chicago, Ill., a corporation of Illinois Application April 6, 1953, Serial No. 346,833

1 Claim. (Cl. 324—151)

The present invention relates to electrical instruments of the moving coil type with a core magnet, and is particularly concerned with such instruments in which all other magnets have been eliminated, the sole magnetomotive force being supplied by a substantially cylindrical solid magnet core of high coercive force.

One of the objects of the invention is the provision of an improved electrical instrument of the moving coil type which is provided with means for adjusting the characteristics of the instrument by moving the magnetic core to change the flux distribution at any time after the instrument has been completely assembled.

Another object of the invention is the provision of an improved electrical instrument, which is best adapted to be used with a preprinted dial because the instrument is capable of adjustment after it is completely assembled for determining the flux pattern, and for effecting a calibration relative to the preprinted dial by rotating the magnetic core which provides the sole magnetomotive force acting in the magnetic circuit of the meter.

Another object of the invention is the provision of an improved electric meter which is more compact than the devices of the prior art, whereby the same patterns and structure may be used for making big or little meters, a big meter in this sense being a more sensitive or stronger meter capable of carrying a bigger pointer because of the existence of greater flux density in the magnetic circuit of the meter.

Another object of the invention is the provision of an improved electric meter of the moving coil type, in which all other magnets have been eliminated and the flux is provided by a centrally located substantially cylindrical core of high coercive force in the form of a magnet which is mounted for rotation inside its pole pieces, so that the flux pattern may be adjusted at any time after the instrument has been completed.

Another object of the invention is the provision of an improved electric meter of the class described, which is self-shielding and which can be placed on a steel panel or located near masses of magnetic metal without changing its calibration due to the presence of external magnetic masses or masses of a paramagnetic material.

Another object of the invention is the provision of an improved electric meter of the moving coil type which is exceptionally small in size, saving space while it is more powerful and more sensitive than devices of the prior art.

Another object of the invention is the provision of an improved electric meter of the moving coil and core magnet type, in which the flux of the core magnet is used more efficiently than the devices of the prior art in that substantially sixty-five percent or more of the flux is used, as distinguished from the horseshoe type magnet devices, which utilize only thirty percent of the flux.

Another object of the invention is the provision of an improved electric meter structure of the moving coil type in which the parts may be manufactured more economically and with greater uniformity than has been heretofore feasible in a core type magnet, because the more important parts, such as the core magnet, pole pieces and yoke all have surfaces of revolution.

Another object of the invention is the provision of an improved electric meter having a round magnet core which may be cut out of round bar stock and formed by centerless grinding.

Another object of the invention is the provision of an electric meter of the moving coil type which is of rigid and rugged construction so that there can be no change in its air gap due to jolts or jars, and so that it may maintain its calibration and sensitivity throughout a long life without necessity for repair or replacement of its parts.

Another object of the invention is the provision of an improved electrical instrument of the moving coil, core magnet type, in which the sensitivity of the instrument is greatly increased over the devices of the prior art, due to the more efficient utilization of flux provided by the core magnet.

Other objects and advantages of the invention will be apparent from the following description and the accompanying drawings, in which similar characters of reference indicate similar parts throughout the several views.

Referring to the two sheets of drawings accompanying this specification,

Fig. 1 is a front plan view of an instrument embodying the invention;

Fig. 2 is an enlarged sectional view, taken on the plane of the line 2—2 of Fig. 1, looking in the direction of the arrows;

Fig. 3 is a top plan view of the meter movement with the dial removed;

Fig. 4 is a view in perspective of the pole piece assembly;

Fig. 5 is a view in perspective of the magnet core;

Fig. 6 is a fragmentary sectional view, taken on the plane of the line 6—6 of Fig. 3, looking in the direction of the arrows;

Fig. 7 is a fragmentary sectional view like Fig. 6, showing the magnetic circuit assembly.

Referring to Figs. 2, 3, and 6, the present meter movement preferably includes a moving coil assembly 10, a solid cylindrical core magnet 11 made of paramagnetic material of high coercive force, such as "Alnico," a pole piece assembly 12, an annular yoke 13, and a bridge assembly 14.

The only source of magnetomotive force in the magnetic circuit of the instrument is the magnet core 11, which, though round, is provided with north and south poles oppositely located at the opposed cylindrical surfaces 15—15. All other U-shaped or horeshoe magnets, exterior to the core 11, as used in the devices of the prior art, have been eliminated.

The core magnet 11 is shown in perspective in Fig. 5, where a perfectly cylindrical body of "Alnico" has the external cylindrical surfaces 15' and plane end surfaces 16 and 17.

Such magnets are so hard that it is very difficult to provide them with bores or other securing devices; but according to the present invention this is not necessary, as the magnet 11 fits inside the circular bore 18 of the pole piece assembly 12, in which it has a rotating fit, but is permitted no lateral movement; and it may be clamped in place by means of the bolts 19, 20 of the bridge assembly, or by using a small amount of adhesive cement, which is placed over the joint between the pole piece assembly 12 and magnet 11 at the end of the bore 18, as shown at 21 in Fig. 3.

The magnet 11 is preferably provided with a dent or groove 22 on its upper plane side adjacent its outer cylindrical edge, which may be formed by means of a chisel before assembly, thus providing shoulders for engaging a pointed tool for rotating the magnet 11 in the assembly of Fig. 3 or Fig. 6 after the meter has been completely assembled.

A rotative force applied to the shoulders of the groove 22 may cause the magnet to rotate in either direction for the purpose of adjusting the flux distribution to improve the characteristics of the meter relative to a preprinted scale.

The pole piece assembly 12 comprises an annular member having the inner cylindrical bore 18, the outer cylindrical surface 23 and plane end surfaces 24 and 25.

The pole piece assembly 12 is made out of a pair of partially annular soft iron members 26 and 27, the ends of which are integrally sweated at 28—31 to the ends of a pair of partially annular brass inserts 32, 33 provided with cylindrical bores 34, 35 extending parallel to the axis of the assembly.

The pole piece assembly 12 and core magnet 11 are accurately machined to cylindrical form at their surfaces 15' and 18 to provide a close rotating fit between the magnet and the pole pieces.

The external yoke 13 comprises a soft iron annular metal member which shields the instrument movement and provides the return path for the magnetic flux which is generated by the magnet 11 and distributed by the pole piece assembly 12.

The annular yoke 13 has an external cylindrical surface 36 and internal cylindrical bore 37, and plane end surfaces 38, 39. The inner diameter of the cylindrical bore 37 of the yoke 13 is sufficiently larger than the outer diameter of the pole piece assembly to provide an annular air gap 40 of uniform radial width all around the pole piece assembly for receiving the axially extending portions of the moving coil 10, which moves in this annular gap.

The magnet core 11 and pole piece assembly 12 are of substantially the same axial length except that the magnet may be made slightly longer, such as a few thousandths, so that it will be clamped by the enlargements 41, 42 on bolts 19 and 20, and by nuts 43, 44 on those bolts when the nuts are drawn up tightly in the adjustment of the instrument.

In other embodiments of the invention where the magnet is to be secured against rotation by cement the pole piece assembly may be made a few thousandths longer, leaving the magnet 11 free to rotate inside the heads 41, 42 and nuts 43, 44 until it is secured in place by cement.

The yoke 13 is provided with a pair of diametrically opposite through bores 45, 46 for receiving the bolts 47, 48 of the bridge assembly, which have a close fit in these bores to aid in preventing any relative movement between the parts after assembly.

The yoke 13 is preferably made longer in an axial direction than the magnet 11 and pole piece assembly 12, so that the yoke exerts a better shielding action, extending axially beyond both the magnet 11 and pole piece assembly 12.

The bridge assembly 14 preferably includes an upper bridge 49, a lower bridge 50, the four bolts 18, 19, 47, 48, the securing nuts for the bolts and the bearing assemblies 51, 52.

The upper bridge 49 comprises a flat strip of nonmagnetic material, such as brass, which is provided with a central threaded bore 53, and with a body portion 54 that is offset axially of the instrument with respect to the attaching flanges 55.

The attaching flanges 55 are each provided with the spaced through bores 56, 57, for receiving the bolts 19 and 47 on one side, and bolts 20 and 48 on the other side.

The offset in the upper bridge 49 is provided by means of a right angle bend at 58, an axially extending portion 59 and another right angle bend at 60 on each side of the bridge. Having the body offset provides an additional space above and below the magnet core and pole piece assembly for the pivots, springs, pointer assembly, etc.

The bottom bridge 50 may be identical in construction to the upper bridge 49 except it is inverted in position with its offset body 54 extending downwardly from its attaching flanges 55.

The bolts 47 and 48 are preferably made of brass and comprise elongated cylindrical members having a cylindrical shank provided with a threaded end portion 61 and with an annular enlargement or head 62, spaced from the upper cylindrical end 63 of the bolt.

The upper cylindrical end 63 is secured in the bore 56 of the top bridge by being riveted over at 64 to clamp the bridge between the riveted portion 64 and the enlargement 62. In the same way the bolts 19 and 20, which are the core support studs, are provided with the cylindrical enlargement 41, 42 acting as heads engaging the top of the pole piece assembly 12, and provided with cylindrical end portions 65 which are riveted over at 66 to secure these studs to the top bridge.

The cylindrical enlargements 42 are longer in an axial direction on bolts 19 and 20, than the enlargements 62 on bolts 47 and 48 to fit the spacing required between the upper bridge 49 and the pole piece assembly 12.

Bolts 20 pass through the bores 34, 35 in the pole piece assembly and are provided with nuts 43, 44 which act as spacers besides securing the pole piece assembly to the studs 19 and 20.

Bolts 19 and 20 pass through the apertures 57 in the lower bridge 50, and are preferably provided with lock washers 67 and clamping nuts 68. Bolts 47 and 48 pass through the bores 45, 46 in the yoke 13, and through the bores 56 in the lower bridge 50, and are provided with lock washers 69 and nuts 70, clamping the yoke 13 between the upper and lower bridges against any movement relative to the pole piece assembly 12, and providing a uniform air gap 40 of annular shape about the pole piece assembly 12.

Various types of moving coil constructions may be employed, and, for example, the moving coil assembly 10 may include a light aluminum rectangular spool 71, provided with a multiplicity of turns of very fine insulated wire 72, or the insulated wire itself may be formed into a rectangular coil without a spool, and held in rigid condition by a coating of plastic cement.

The size and shape of the coil 72 is such that it may rotate in the air gap 40, equally spaced from both walls of the air gap without danger of contacting any adjacent parts.

At each end the coil 72 is provided with a centrally located pivot base 73, 74, cemented to the coil, and provided with means for securing one end of each spiral spring 75, 76, which end is electrically connected to one end of the coil 72.

The pivot base at each end is provided with a conically pointed spindle 77, 78, the end of which is rotatably mounted in a jewel 79, carried by a jewel screw 80, threaded into each bridge. Each jewel screw 80 is secured in place by a jewel lock nut 81, having an annular flange engaging a spring washer 82, which is compressed against the bridge or other parts carried by the pivot screw.

The upper pivot screw carries a rotatable zero adjustment clip 83, having a downwardly turned end secured to the outer end of the spring 75. The lower pivot screw 80 carries a bottom zero adjustment spring clip 84, having its end secured to the outer end of spring 76 for adjustment of the lower spring.

The upper pivot base 73 also carries a pointer 85, having a plurality of radially extending arms 86 provided with adjustable balance weights 87. The balance weights 87 are held in place by the arms of a balance weight lock 88 for counterbalancing the moving coil assembly.

Referring to Figs. 1 and 2, the instrument movement is preferably provided with a dial plate 89, having a plurality of arcuate scales 90, 91, 92, 93, which are arcuate in shape and drawn on a center of curvature corresponding to the axis of the spindles 77, 78.

The dial plate may consist of a sheet of brass provided with a paper covering which is preprinted with the scales and scale divisions, as shown in Fig. 1. The scales are for use of the instrument with various electrically constant resistors, inductances, condensers, etc., for the use of the same movement in measuring various electrical quantities by connecting multipliers, etc. in circuit.

The dial plate 89 is preferably supported fixedly with respect to the movement by means of screw bolts, which may be threaded into threaded bores 95 in the upper ends of bolts 47, 48.

The operation of the improved electric meter is substantially the same as other moving coil instruments; but after the entire instrument has been assembled the core magnet 11 may be caused to rotate inside the pole piece assembly 12 by engaging a sharp instrument in the notch 22 of the core magnet.

The amount of permissible rotation may be limited but is not necessarily limited as only a few degrees motion in either direction are required. For example, the meter may read high at its upper end or at its lower end, requiring a redistribution of the flux after it has been assembled.

In general, a greater movement of the pointer at any part of the range may be accomplished by increasing the flux at that range of the instrument, and the magnet may be rotated to move the north and south poles in a direction toward the point where an increase in flux is desired.

Conversely, the magnet may be rotated so that its north and south poles move away from the place where less flux is desired.

After the magnet has been rotated to the desired position it may be secured in place by clamping it by means of the bolts 19 and 20, or by placing a drop of suitable cement, such as "Glyptol" across the joint between the magnet 11 and pole piece assembly 12.

The present meter construction may be used to construct bigger meters by using longer cores, longer pole piece assemblies and longer yokes, a big meter being one which is more sensitive or stronger and adapted to carry a bigger pointer by reason of the fact that it has its moving coil driven by a greater amount of flux.

Referring to Fig. 6, multiple yokes, pole piece assemblies and magnet cores may be stacked and clamped by studs of suitable length, thus making a bigger meter out of the same parts with longer bolts, but the various magnetic structures are preferably integrally formed out of parts of a length suitable for the sensitivity or size of meter desired.

It will thus be observed that I have intended an improved meter movement in which the flux distribution and characteristics of the meter may be adjusted after the meter is completely assembled with its dial, by rotating the core magnet within its pole pieces and securing it in a proper adjusted position.

The present meter movements may be used with preprinted dials having substantially linear scale divisions, because the flux pattern can be adjusted after assembly.

The assembled structures constructed according to the invention are sturdy, rigid and rugged and maintain their calibration although subjected to many shocks or jars which would destroy the calibration of the instruments of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

In a moving-coil instrument, the sub-combination which comprises a generally annular pole-piece assembly consisting of a pair of paramagnetic pole pieces of arcuate cross section and a pair of non-magnetic inserts disposed between and spacing apart said pole pieces, said pole-piece assembly having an axial cylindrical bore therethrough, a permanent magnet of cylindrical shape accurately dimensioned on its outer surface to fit rotatably and slidably within said cylindrical bore, said magnet being magnetized along a magnetic axis substantially perpendicular to its geometric axis, means limiting axial movement of said magnet relative to said pole-piece assembly when said magnet is fitted within said bore but leaving said magnet free to rotate therewithin through at least a limited arc, and other means for securing said magnet in a fixed angular position within said bore, said magnet being provided with a small tool socket externally accessible when said magnet is within said bore for facilitating rotational adjustment of said magnet to a desired angular position, said securing means being actuatable after such rotational adjustment to secure permanently said magnet in the desired angular position.

References Cited in the file of this patent

UNITED STATES PATENTS

| | | |
|---|---|---|
| 1,927,346 | Lawrence | Sept. 19, 1933 |
| 2,414,462 | Grace | Jan. 21, 1947 |
| 2,547,665 | Rowell | Apr. 3, 1951 |
| 2,650,349 | Lamb | Aug. 25, 1953 |
| 2,725,529 | Bernreuter | Nov. 29, 1955 |

FOREIGN PATENTS

| | | |
|---|---|---|
| 891,979 | France | Mar. 24, 1944 |
| 212,041 | Switzerland | Oct. 31, 1940 |